Feb. 16, 1943.  W. HUTTON  2,311,176
METHOD FOR FILLETING FISH
Filed May 27, 1941  4 Sheets-Sheet 1
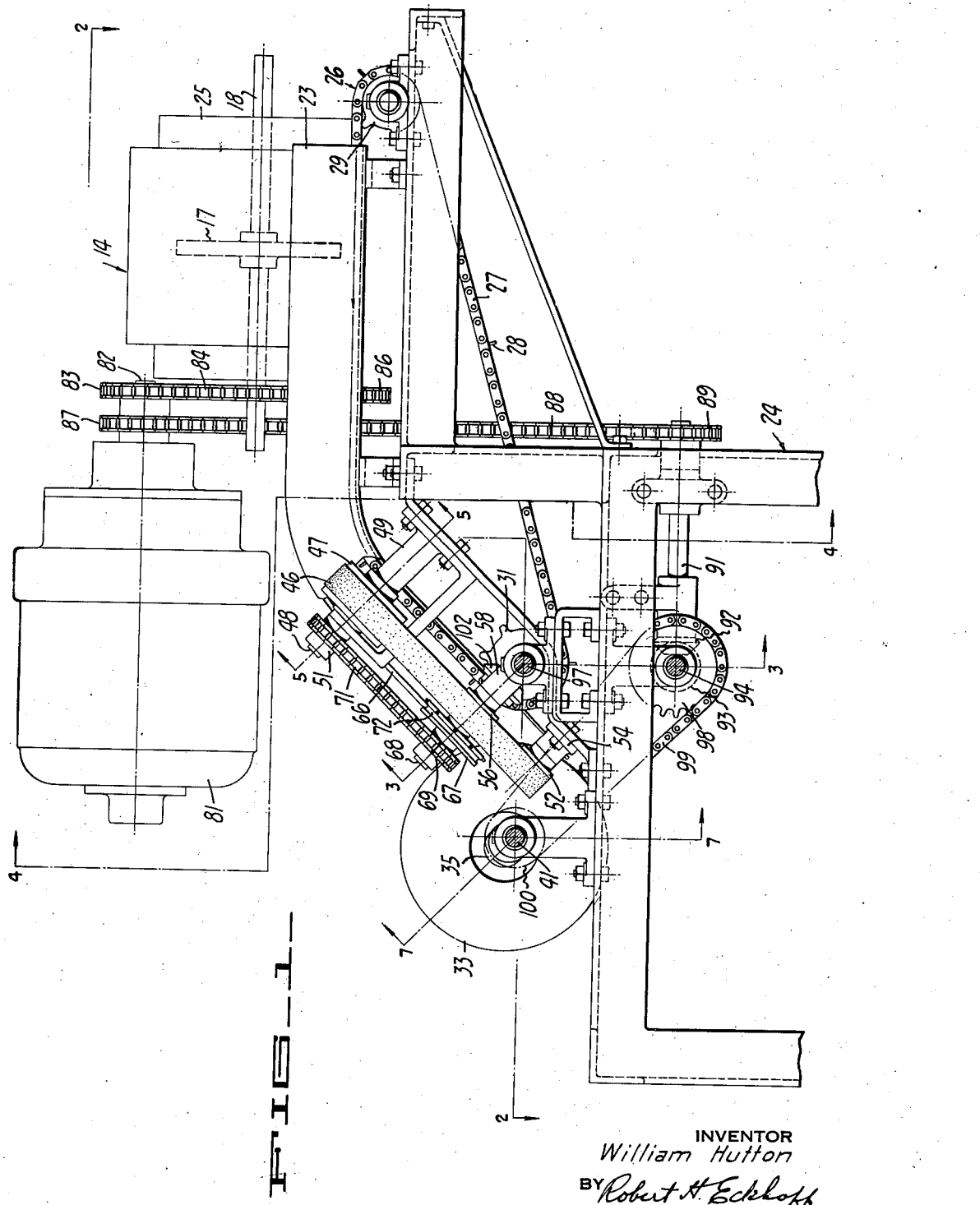
INVENTOR
William Hutton
BY Robert H. Eckhoff
ATTORNEY

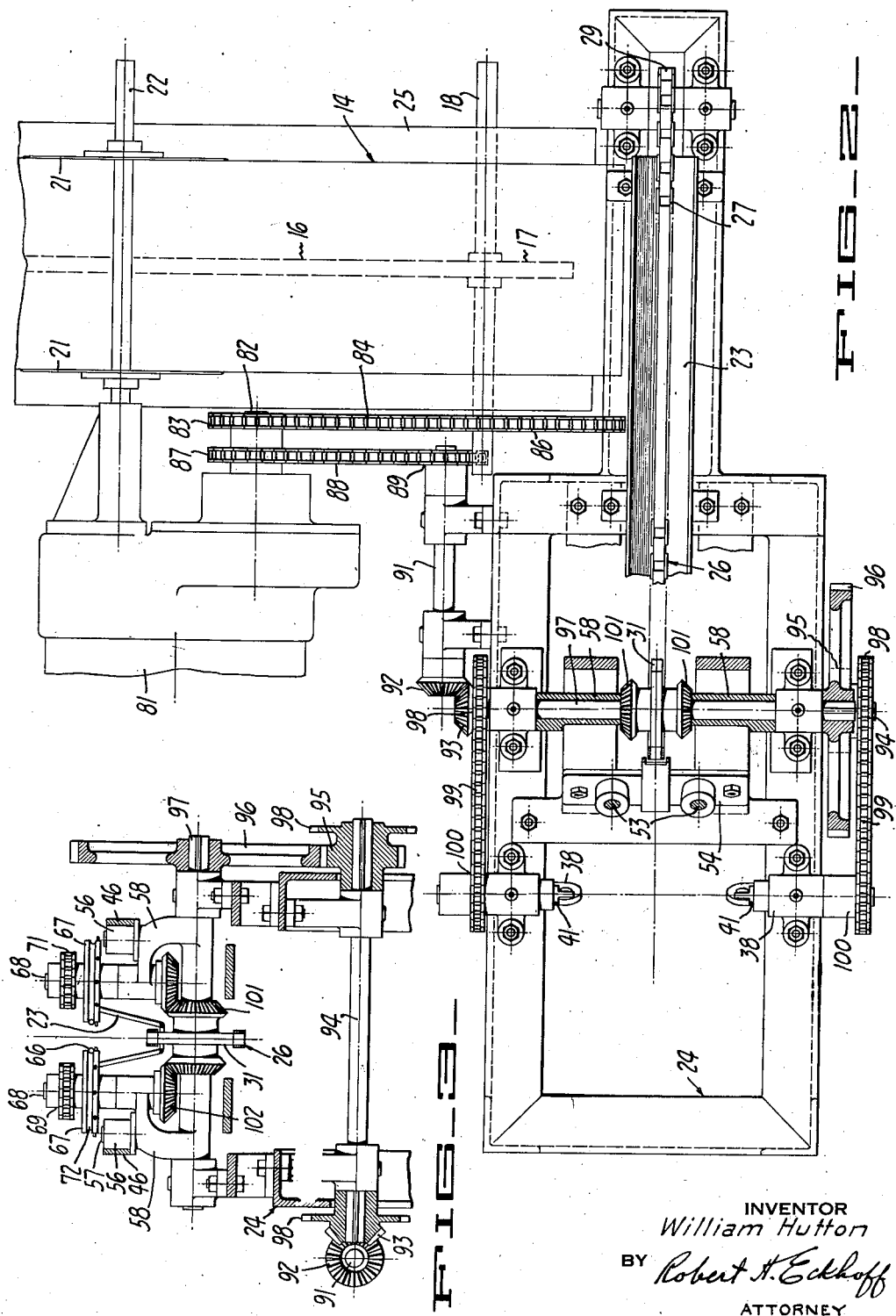

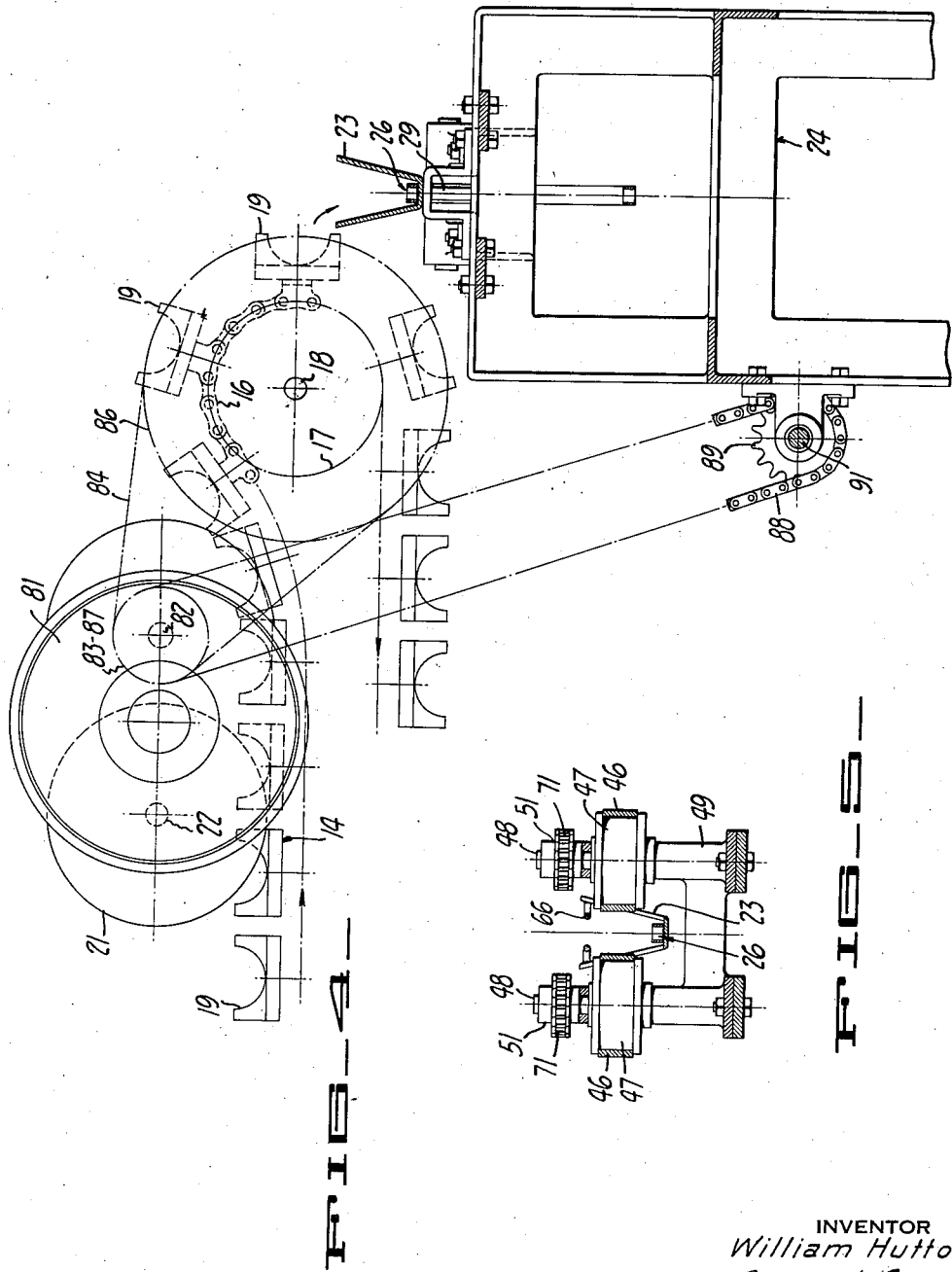

Feb. 16, 1943. W. HUTTON 2,311,176
METHOD FOR FILLETING FISH
Filed May 27, 1941 4 Sheets-Sheet 4
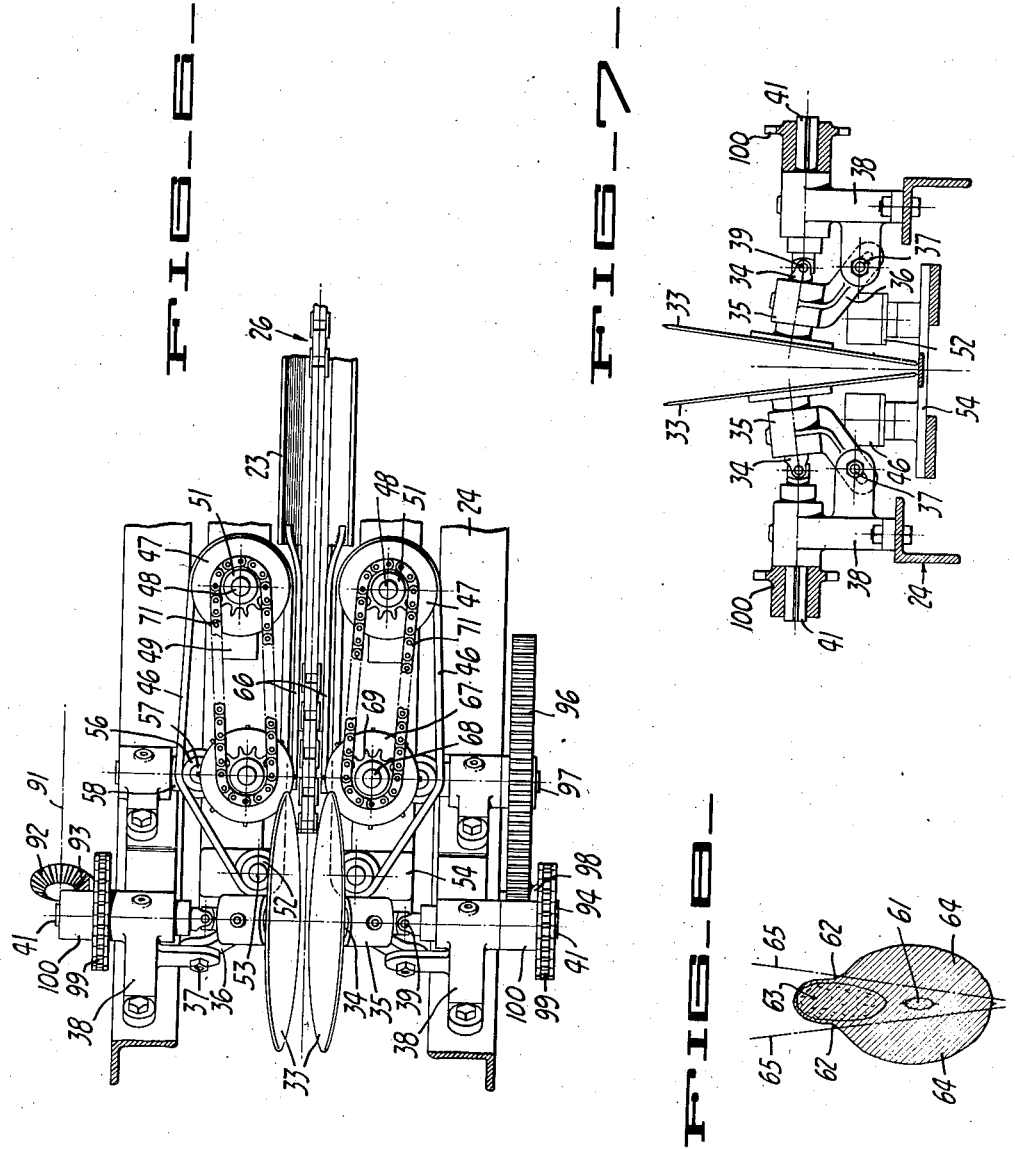
INVENTOR
William Hutton
BY Robert H. Eckhoff
ATTORNEY Patented Feb. 16, 1943

2,311,176

UNITED STATES PATENT OFFICE 2,311,176

METHOD FOR FILLETING FISH

William Hutton, Monterey, Calif., assignor to Seapride Packing Corporation, Ltd., a corporation of California Application May 27, 1941, Serial No. 395,401

2 Claims. (Cl. 17—45)

This invention relates to a method for filleting fresh fish. Certain fish, particularly Monterey sardines, are usually filleted by hand and the fillets then smoked or canned, the fillets being so cut from the fish that only the fine, boneless meat is cut from the fish. To facilitate this operation, to make it practical on a large scale basis enabling it to be practiced as a commercial venture, I have devised a method for handling fish and cutting fillets therefrom and, also, a machine for practicing this method and handling the fish on a large scale.

It is in general the broad object of the present invention to provide a fish fillet machine capable of rapid and efficient operation to the end that there is cut from the fish only the finest, boneless meat. In this connection it is to be pointed out that while various machines have been designed heretofore to cut fish, these have been such that, in effect, they merely slice from the fish slabs of meat and this more or less indiscriminately and without regard to whether bones, fins or other undesirable portions are included. In this connection I wish to point out that Monterey sardines have a black membrane, the peritoneum, lining the abdominal portion of the fish which is not removed in the usual eviscerating operation. The prior art has usually contented itself with merely slicing the sides of the fish away from the backbone after evisceration, such an operation being typically shown in Figures 11 and 12 in the Faulkner Patent 2,234,431 of March 11, 1941. In accordance with this invention the fish, freed of only its head and tail, is so handled and cut as to leave intact the backbone, rib portions of the fish and the portion carrying the fins, while two slabs are cut from the fish, one at each side thereof, substantially free from any bones and free from any portion of the peritoneum. In this way one is able to provide the public, at very low cost, with the finest meat having a very palatable appearance.

The invention includes other objects and features of advantage some of which, together with the foregoing, will appear hereinafter wherein the present preferred form of machine of this invention and the process of this invention are respectively disclosed.

In the drawings accompanying and forming a part hereof and illustrating the present preferred machine embodying this invention, Figure 1 is a side elevation illustrating the machine and its general relation to certain feed mechanisms.

Figures 2, 3, 4, 5 and 7 are respectively sections taken along the section lines 2—2, 3—3, 4—4, 5—5, and 7—7 of Figure 1.

Figure 6 is a fragmentary plan view of a portion of the feed mechanism and fillet slicing machine.

Figure 8 is a diagrammatic view illustrating the handling and cutting of a fish in accordance with this invention.

The machine of the present invention includes a first conveyor generally indicated at 14 (Figures 1, 2 and 4), made up of a chain 16 suitably supported for movement by means including a sprocket 17 mounted on a shaft 18 journaled on frame 25. Secured to spaced links of the chain are recessed conveyor blocks 19 to receive the fish. Conveyor 14 moves to the right in Figure 4 and, as it does so, it passes beneath a pair of spaced knives 21 mounted on a shaft 22, the knives fitting snugly against the end of the conveyor blocks 19 to slice off any portions of the fish extending beyond the ends of the blocks, usually the heads and tails. The tailless and headless fish are discharged into a stationary trough 23 supported on a suitable frame 24 usually placed at right angles to frame 25 supporting conveyor 14, both frames being made up of suitable angle and channel irons welded or bolted together as desired. Inasmuch as the frame can be provided in any desired manner, it will not be further described.

A feed conveyor 26 made up of a chain 27 having a plurality of open links 28 to engage and hold the fish is provided at the bottom of the trough, being extended about sprockets 29 and 31 suitably journaled on the frame 24. As appears in Figure 1, conveyor 26 moves downwardly as it advances toward a pair of spaced fillet cutting knives 33 to carry a fish in for cutting. Each knife is carried upon a suitable shaft 34 rotatable in a bearing 35 provided in bracket arm 36. Each arm 36 is secured by a bolt 37 to a bracket 38 on opposite sides of the frame 24 to enable the knife angle to be adjusted. The adjustable brackets enable the angle of the knives to be varied although an acute angle between them of about 10° usually suffices. Each shaft 34 is secured by a universal joint 39 to a drive shaft 41 suitably journaled in the supporting bracket 38.

Depending upon the size of the fish being handled it may be possible to run the feed conveyor 26 between the knives. However, with small fish as sardines, it is preferable to terminate the feed conveyor 26 short of the space between the knives to secure the maximum fillet cut from the fish. Also, to ensure that the maximum amount of boneless, fine meat be cut from the side of the fish I provide feeding means to facilitate handling of the fish and positive feeding of the fish onto the rotating knives with the fish so shaped that the largest fillet cut is secured therefrom. To this end I train two conveyor belts 46, one on each side of the machine, to continue the sides of the trough 23 and preform the fish for filleting. The belts are advanced to the left in Figure 6 and are normally parallel to each other and parallel to a plane normal to the plane of movement of the feed conveyor 26 as they move along in engagement with the fish, advancing it on toward the cutting knives. Each flat belt 46 is trained about a drive pulley 47 suitably journaled on shaft 48 mounted in a bracket 49 mounted on the side of the machine, the pulley 47 being suitably connected to a drive sprocket 51. The flat belt is trained about an idler pulley 52 journaled on a shaft 53 and mounted in a bracket 54 secured on the frame of the machine. The belt 46 also passes about an idler pulley 56 journaled on a shaft 57 supported by bracket 58. The function of the belts is twofold: first, to advance the fish and, second, to form the fish for filleting by compressing the fish belly to work the entrails and body cavity into such position that they are out of the way of the cutting knives. In accordance with this invention other means are provided for assisting in working the fish entrails out of the way whereby only the finest boneless meat is cut from the sides of the fish and the backbone, ribs, other bone structure, as well as the belly and fin portion of the fish are left. This has been more or less diagrammatically shown in Figure 8 wherein it is to be noted that the backbone indicated at 61, the rib and bone structure indicated at 62 and the belly portion 63 of the fish are left while the outside fillets 64 have been separated along the two dotted lines 65 corresponding to the cutting knives' path. To facilitate in this I provide a pair of wire or rodlike members 66 joined to the end of the trough 23 and extending substantially to engagement with the cutting knives, these rods serving to pinch inwardly the opposite belly portions of the fish as it is fed on between the knives. Positive feed means are provided, in conjunction with the knives and wires 66, in the form of the toothed wheels 67 secured to shafts 68 journaled in brackets 58. Each toothed wheel 67 is grooved as at 72 and the wires or rods 66 fit therein. This ensures that the fish is moved positively along the wires as it is compressed by them and the body cavity is so deformed temporarily as to hold the entrails out of the way of the knives. Each shaft 68 includes a sprocket 69 thereon, a chain 71 being extended about the sprocket 69 and the sprocket 51 on shaft 48 to drive the belt 46.

The various elements of the machine are suitably driven in a timed relation and to effect this I provide a suitable prime mover generally indicated at 81 having one drive shaft 22 extending therefrom to drive the knives 21. Another drive shaft 82 bears a first sprocket 83, a chain 84 being extended about this and about a sprocket 86 on shaft 18. Another sprocket 87 is provided on shaft 82 and a chain 88 is extended to pass about it and about a sprocket 89 on a shaft 91 suitably journaled on the side of frame 24 (Figures 2 and 4). Shaft 91 carries a mitre gear 92 at one end thereof engaging a mitre gear 93 on a shaft 94 carrying spur gear 95 meshing with larger gear 96 on shaft 97 which carries sprocket 31 of the conveyor 26 to drive that conveyor. Sprockets 98 are mounted on opposite sides of shaft 94 and chains 99 are trained about these and about sprockets 100 on shafts 41 to drive the knives.

The positive feed wheels 67 and the belt conveyors 46 are driven by means of mitre gears 101 positioned on each side of sprocket 31 on the shaft 97, each mitre gear being engaged with a mitre gear 102 carried on shaft 68.

In operation, with the prime mover actuated, the various feed means are driven in a timed relation. Tailless and headless fish are delivered to the trough 23 and are advanced through that trough by the conveyor 26, the backbone side of the fish being in engagement with the conveyor 26, the belly being up. As the fish is advanced toward the cutting knives, the opposite belt conveyors 46 and the wires 66 compress and deform the abdomen of the fish and retain it in such a position that, as the fish is advanced into the knives, it presents a solid mass of flesh and bone. The belly portion of the fish is not cut, while adequate fillets are cut from each side. By deforming the belly portion, pressing inwardly along opposite sides, the entrails are compressed up into a compact, narrow vertical pocket lying wholly between the knives to escape cutting. With the knives properly adjusted, the fillets, free of bones or any belly portion, are quickly cut therefrom. The backbone of the fish, the fin and belly portion, pass on between the knives while the fillets are thrown off to each side of the knives to be collected for subsequent processing.

I claim:

1. A method of preparing fish fillets comprising decapitating a fish, placing the fish in a predetermined position in which the fish is supported on its back, forcing together the opposite sides of said fish to force the entrails into a relatively narrow space running lengthwise of the fish and away from its spine and, while the belly is so deformed, slicing a fillet off each side of the fish to leave the back and belly intact and joined together by the bone structure of the fish.

2. A method of preparing fish fillets comprising decapitating the fish, placing the fish in a predetermined position in which the fish is supported on its back, forcing together the opposite sides of said fish and pinching together those portions of the fish belly immediately adjacent the middle of the fish to force the entrails away from the fish spine and, while the belly is so deformed, slicing a fillet off each side of the fish without cutting into the belly portion of said fish.

WILLIAM HUTTON.